(12) United States Patent
Sugihara et al.

(10) Patent No.: US 7,575,289 B2
(45) Date of Patent: Aug. 18, 2009

(54) RUBBER CRAWLER RUNNING DEVICE

(75) Inventors: Shingo Sugihara, Yokohama (JP); Hitoshi Akiyama, Fujisawa (JP)

(73) Assignee: Bridgestone Corporation, Tokyo (JP)

( * ) Notice: Subject to any disclaimer, the term of this patent is extended or adjusted under 35 U.S.C. 154(b) by 327 days.

(21) Appl. No.: 10/511,100

(22) PCT Filed: Apr. 18, 2003

(86) PCT No.: PCT/JP03/04971

§ 371 (c)(1),
(2), (4) Date: Nov. 9, 2004

(87) PCT Pub. No.: WO03/086841

PCT Pub. Date: Oct. 23, 2003

(65) Prior Publication Data
US 2005/0248214 A1 Nov. 10, 2005

(30) Foreign Application Priority Data
Apr. 18, 2002 (JP) .............................. 2002-116587
Apr. 11, 2003 (JP) .............................. 2003-108052

(51) Int. Cl.
B62D 25/16 (2006.01)
(52) U.S. Cl. ....................................... 305/107; 305/116
(58) Field of Classification Search ................. 305/100, 305/107, 110, 116, 120, 165, 178, 109, 126, 305/127, 139, 173, 179, 195
See application file for complete search history.

(56) References Cited

U.S. PATENT DOCUMENTS

| 1,165,708 | A | * | 12/1915 | Porter | 180/9.54 |
| 1,276,929 | A | * | 8/1918 | Johnson | 305/120 |
| 1,503,597 | A | * | 8/1924 | Norelius | 180/9.6 |
| 1,697,970 | A | * | 1/1929 | Decker | 280/762 |
| 2,167,039 | A | * | 7/1939 | Ekbom | 305/111 |
| 2,934,383 | A | * | 4/1960 | Barnes | 305/123 |
| 3,118,709 | A | * | 1/1964 | Case | 305/170 |
| 3,172,707 | A | * | 3/1965 | Tucker, Sr. | 305/123 |
| 3,418,961 | A | * | 12/1968 | Gregg | 440/12.64 |
| 3,680,925 | A | * | 8/1972 | Spivy | 305/168 |
| 3,690,394 | A | * | 9/1972 | Skime | 305/127 |

(Continued)

FOREIGN PATENT DOCUMENTS

FR 886609 10/1943

(Continued)

*Primary Examiner*—Russell D Stormer
(74) *Attorney, Agent, or Firm*—Oliff & Berridge, PLC

(57) ABSTRACT

A rubber crawler running device which includes a drive wheel connected to a drive shaft of a vehicle body, an idler wheel, and a rubber crawler having rubber projections formed on an inner peripheral surface thereof at predetermined intervals, the drive wheel and the idler wheel being disposed substantially horizontally, the rubber crawler being wound around the drive wheel and the idler wheel and contacting the running surface, wherein the drive wheel is formed so that engaging teeth thereof which engage with the rubber projections are exposed at right and left sides, and further comprising a guide skirt body fixed to the vehicle body and disposed at transverse direction outer sides of the drive wheel at a portion at which the rubber crawler is wound around the drive wheel, with a gap being kept between the drive wheel and the guide skirt body.

4 Claims, 10 Drawing Sheets

U.S. PATENT DOCUMENTS

| | | | | |
|---|---|---|---|---|
| 3,711,165 A | * | 1/1973 | Russ, Sr. | 305/178 |
| 4,003,608 A | * | 1/1977 | Carter | 305/196 |
| 4,099,795 A | * | 7/1978 | Roley | 305/122 |
| 4,134,622 A | * | 1/1979 | Krolak et al. | 305/107 |
| 4,198,103 A | * | 4/1980 | Ward et al. | 305/165 |
| 4,278,391 A | * | 7/1981 | Dagenais | 414/559 |
| 4,402,555 A | * | 9/1983 | Ogaki et al. | 305/102 |
| 4,961,395 A | * | 10/1990 | Coast | 440/12.64 |
| 5,839,802 A | * | 11/1998 | Sheets | 305/52 |
| 6,000,766 A | * | 12/1999 | Takeuchi et al. | 305/160 |
| 6,267,458 B1 | * | 7/2001 | Hansen et al. | 305/107 |

FOREIGN PATENT DOCUMENTS

| | | | |
|---|---|---|---|
| FR | 2 665 415 | | 2/1992 |
| FR | 2 674 492 | | 10/1992 |
| JP | A 61-057474 | | 3/1986 |
| JP | 63-235182 | * | 9/1988 |
| JP | A 2-286476 | | 11/1990 |
| JP | A 6-144306 | | 5/1994 |
| JP | Y2 259082 | | 12/1998 |
| JP | A 2000-272557 | | 10/2000 |
| WO | WO 95/29835 A1 | | 11/1995 |

* cited by examiner

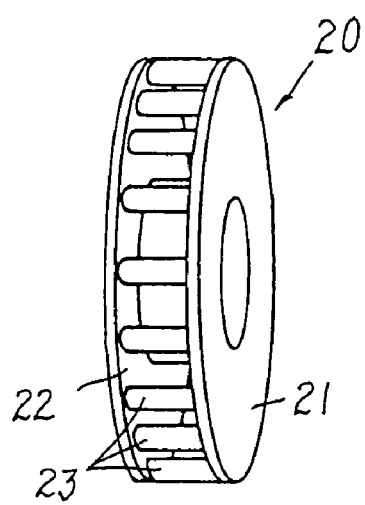
FIG. IA
PRIOR ART
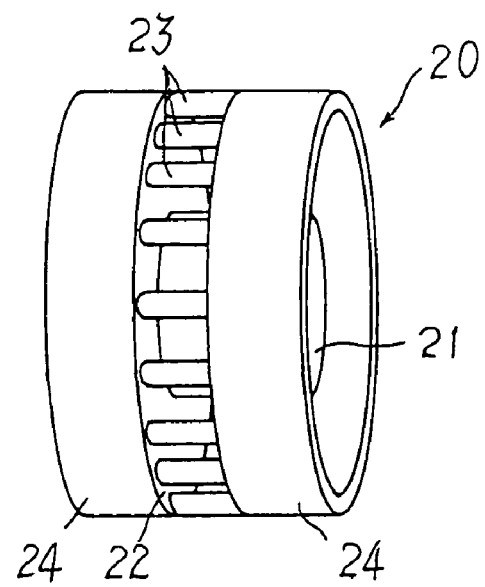
FIG. IB
PRIOR ART

RUBBER CRAWLER RUNNING DEVICE

TECHNICAL FIELD

The present invention relates to a device for running a rubber crawler mounted to a body of a vehicle such as a tractor or a skid steering loader, and more particularly to the prevention of running-off of the rubber crawler.

BACKGROUND ART

A rubber crawler is driven by either engaging projections on an inner peripheral surface of the rubber crawler with sprockets (coreless type drive system) or engaging cores embedded in the rubber crawler with sprockets (core type drive system).

FIGS. 1A, 1B and 2 each show a conventional drive wheel 20. FIG. 1A shows a structure in which a pair of discs 21 and 22 fixed to a drive shaft face each other and a predetermined number of pins 23 extend between the circumferences of the discs 21 and 22. Further, FIG. 1B shows a structure in which annular flanges 24 are formed at the peripheries of the discs 21 and 22. Furthermore, FIG. 2 shows the structure of a star-shaped drive wheel which does not have the discs described above but has a predetermined number of teeth 26 on the periphery of a hub 25 fixed to a drive shaft.

When these drive wheels are used for, for example, the coreless type rubber crawler, the pins 23 and the teeth 26 engage with the projections formed on the inner peripheral surface of the rubber crawler at predetermined intervals, such that the pins 23 and the teeth 26 can successively move together with the projections and transmit a driving force to the rubber crawler.

Because of this structure, soil and fibrous materials cannot be prevented from entering the inner periphery of the rubber crawler during the running (or operation) thereof. When soil is caught up between the rubber crawler and the sprocket (or an idler wheel), phenomena occur such as inadequate engagement of the rubber crawler with the sprocket and application of excessive tension to the rubber crawler. Due to these phenomena, the rubber crawler may be disengaged from the sprocket, and consequently, the circumference of the rubber crawler may deviate, thereby making the rubber crawler unusable.

More specifically, the drive wheels shown in FIGS. 1A and 1B are structured such that the running-off (or disengagement) of the rubber crawler is prevented by pressing the protrusions of the rubber crawler from the right and left by the discs 21 and 22, since the discs 21 and 22 are present at the right and left. Moreover, in FIG. 1B, the flanges 24 contact the inner peripheral surface of the rubber crawler so as to support the tension applied thereto.

However, a drawback arises in that the rubber crawler does not fully engage with the drive wheel since fibrous materials such as grass and straw easily get tangled around the pins 23. Further, the vicinity of the rubber projections of the rubber crawler (right and left sides) is closed by the discs 21 and 22, thereby forming a closed space. With this structure, when the rubber projections engage with the drive wheel, mud and the fibrous materials around the rubber projections become hard and build up without escaping to the outside. This buildup layer gradually becomes thick during running, resulting in an increased gap between the inner peripheral surface of the rubber crawler and the drive wheel. Thus, the tension applied to the rubber crawler becomes extremely large, and steel cords embedded in the rubber crawler remain fully stretched, thereby shortening the life of the rubber crawler. The rubber crawler is inevitably disengaged from the drive wheel due to their insufficient engagement.

In contrast, in the drive wheel shown in FIG. 2 has no discs (21, 22) at the right and left sides of engaging teeth which engage with the rubber projections. Thus, the engaging teeth are exposed, and few fibrous materials get tangled around the engaging teeth 26. Further, the fibrous materials and soil are easily discharged, and the phenomenon of soil and the like near the rubber projections becoming hard hardly occurs. As a result, the gap between the inner peripheral surface of the rubber crawler and the drive wheel is hardly increased, and the tension applied to the rubber crawler does not become extremely large. However, since the discs 21 and 22 are absent, the drive wheel has no function of preventing lateral displacement of the drive wheel and the rubber crawler relative to each other. For this reason, running off of the rubber crawler from the drive wheel is inevitable when the drive wheel is rotated or an external force is applied to the rubber crawler in a lateral direction.

DISCLOSURE OF THE INVENTION

The present invention provides a rubber crawler running device which is less likely to form a hardened mass of fibrous materials and mud near rubber projections formed on an inner peripheral surface of a rubber crawler mounted to a body of a vehicle, and prevents running-off of the rubber crawler from a drive wheel by controlling the movement of the rubber crawler in lateral directions.

In order to overcome the above-described drawbacks, the present invention provides a rubber crawler running device.

Specifically, the drive wheel forming the running device of the present invention includes a central portion connected to the drive shaft of the vehicle body, and the engaging teeth which are formed radially from the central portion and engage with surfaces of the rubber projections in a longitudinal direction of the rubber crawler. The engaging teeth are exposed at the right and left sides thereof, and there are no discs or flanges enclosing the engaging teeth.

The rubber crawler forming the running device of the present invention specifically has the rubber projections formed at the central portion of the inner peripheral surface at predetermined intervals such that the rubber projections engage with the engaging teeth of the drive wheel. The rubber projections are conveniently formed on a continuous protruding streak on the inner peripheral surface of the rubber crawler.

The guide skirt body forming the running device of the present invention is conveniently provided so as to correspond to the periphery of the drive wheel at a portion thereof not abutting a road surface. The guide skirt body may be in the shape of a plate, a bar, or a ring which is disposed at outer sides of the drive wheel in a transverse direction thereof. The total width of the gaps between the rubber projections and the guide skirt bodies at the right and left sides is equal to or less than the width of the rubber projection in a transverse direction thereof.

BRIEF DESCRIPTION OF THE DRAWINGS

FIGS. 1A and 1B are views showing examples of conventional drive wheels.

BEST MODE FOR CARRYING OUT THE INVENTION

Figure 2:
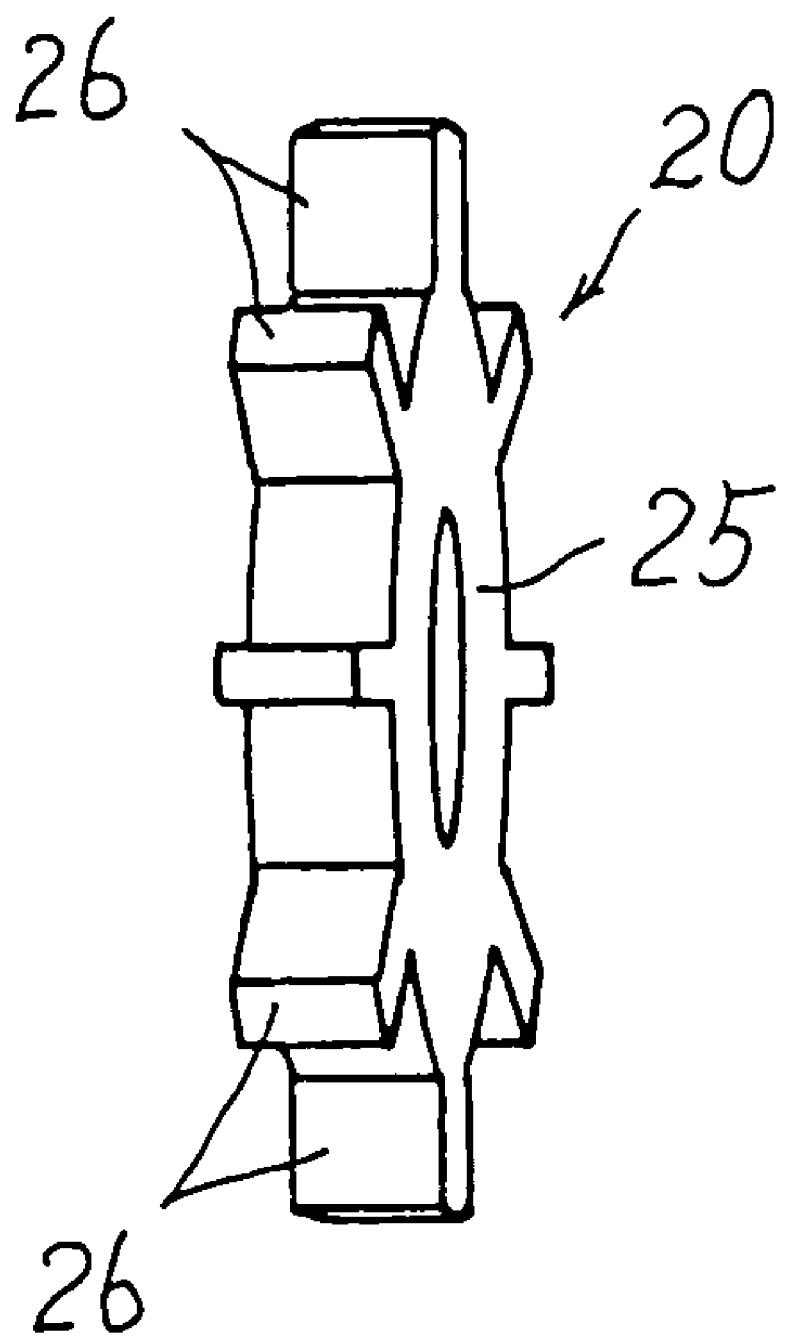
FIG. 2 is a view showing another example of the conventional drive wheels.

The rubber crawler running device of the present invention is structured as described above and intended to prevent formation of a layer 49 of foreign materials which is mainly comprised of mud. For this purpose, a drive wheel which is structured so as not to form a closed space near the pins is used. The drive wheel further includes guide skirt bodies at right and left sides thereof in order to prevent so-called running-off (disengagement) of a rubber crawler from the drive wheel. When the running directions of the rubber crawler and the drive wheel become different from each other, rubber projections of the rubber crawler contact the guide skirt bodies, whereby their positions are corrected. In this way, running off of the rubber crawler from the drive wheel is prevented.

The present invention will be described below by taking the most specific coreless type rubber crawler running device as an example. FIGS. 3A and 3B show the relationship between rubber projections 41 of a rubber crawler 40 and the pins (engaging teeth) 23 of the drive wheel 20 shown in FIG. 2. FIG. 3A shows a normal engagement state, while FIG. 3B shows an engagement state when the layer 49 of foreign materials adheres to an inner surface of the rubber crawler 40. Namely, in this example, engagement of the rubber projections 41 with the pins 23 starts at the uppermost position of the drive wheel 20, and the rubber projections 41 and the pins 23 are successively rotated. In FIG. 3A, the pins 23 abut concave portions between the rubber projections 41 and are rotated together with the rubber projections 41. When the layer 49 of foreign materials is present, the length of the inner periphery of the rubber crawler 40 changes by the thickness of the layer 49. When the start point of the engagement is considered to be in the normal state, the positions of the pins 23 are gradually displaced from their positions in the normal state, as shown in FIG. 3B. As a result, the pins 23 chip the rubber projections 41 away, thereby generating significant wear. Further, since the pins 23 are not positioned between the rubber projections 41, the phenomenon of the rubber crawler being lifted from the drive wheel 20 occurs, and the rubber crawler 40 is frequently disengaged from the drive wheel 20. Particularly in the case of a running device having a drive wheel provided therein, the overall weight of a vehicle body is applied to a single rubber projection, thereby damaging the rubber projection. The running device having the layer of foreign materials around the pins 23 also has such a drawback.

The formation of the layer 49 of foreign materials has a significantly adverse effect on the rubber crawler. Particularly, the drive wheels shown in FIGS. 1A and 1B are much likely to harden, around the rubber projections 41, mud and the like adhering to the inner surface of the rubber crawler 40, rather than escaping the mud to the right and left sides of the rubber crawler 40.

Figure 3B:
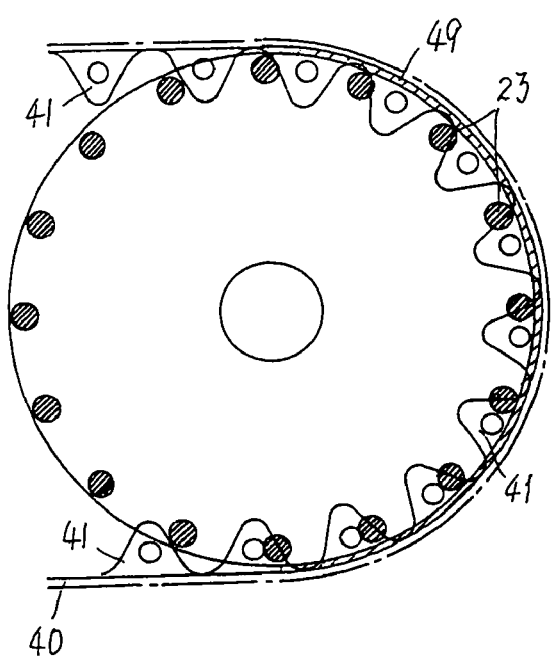
FIGS. 3A and 3B are views showing the states of conventional rubber crawler running devices.
Figure 3A:
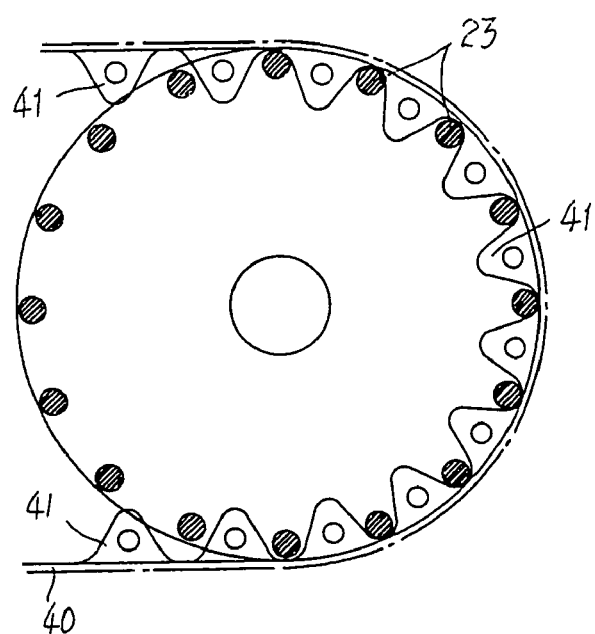

The drive wheel 20 shown in FIG. 2, to which mud hardly adheres, is particularly preferable for use because of the great effects thereof, and the present invention has adopted the drive wheel shown in FIG. 2. Namely, in the conventional manner, the drive wheel and the discs are integrally formed for rotation as shown in FIGS. 1A and 1B. In the present invention, however, the engaging teeth and the discs are separated from each other in order to separate the functions thereof, and the portions corresponding to the discs are formed as the guide skirt bodies fixed to the vehicle body and disposed along the right and left sides of the engaging teeth. The guide skirt bodies are not rotated together with the drive wheel or do not form a closed space for the rubber projections. Further, a large amount of mud and pebbles are present at a portion which contacts a road surface and at which the rubber projections engage with the engaging teeth. The guide skirt bodies are conveniently provided at portions not contacting the road surface so that discharging mud and pebbles to the right and left sides of the rubber projections is not interrupted.

Namely, in this example, a closed space in which mud and the like harden is absent around the rubber projections. Thus, the phenomenon of hardened mud hardly occurs, and this example sufficiently has a function of discharging mud. The guide skirt body is fixed to the vehicle body and even has a function of correcting displacement of the drive wheel and the rubber projections relative to each other in the lateral directions. In order to carry out this function, the guide skirt body may be plate-shaped, but may be a ring having a circular or elliptical cross section in view of cost reduction. The total width of the gaps between the rubber projections and the guide skirt bodies at the right and left sides is conveniently equal to or less than the width of the rubber projection in a transverse direction thereof.

The rubber crawler is preferably structured so that it is difficult for mud and the like to go into the vicinity of the guide skirt body and the rubber projection. The rubber projection is preferably provided at a position somewhat away from the inner peripheral surface of the rubber crawler, rather than directly on the inner peripheral surface. For example, the rubber projections are conveniently formed on a protruding streak continuously formed on the inner peripheral surface of the rubber crawler.

EXAMPLES

Figure 4:
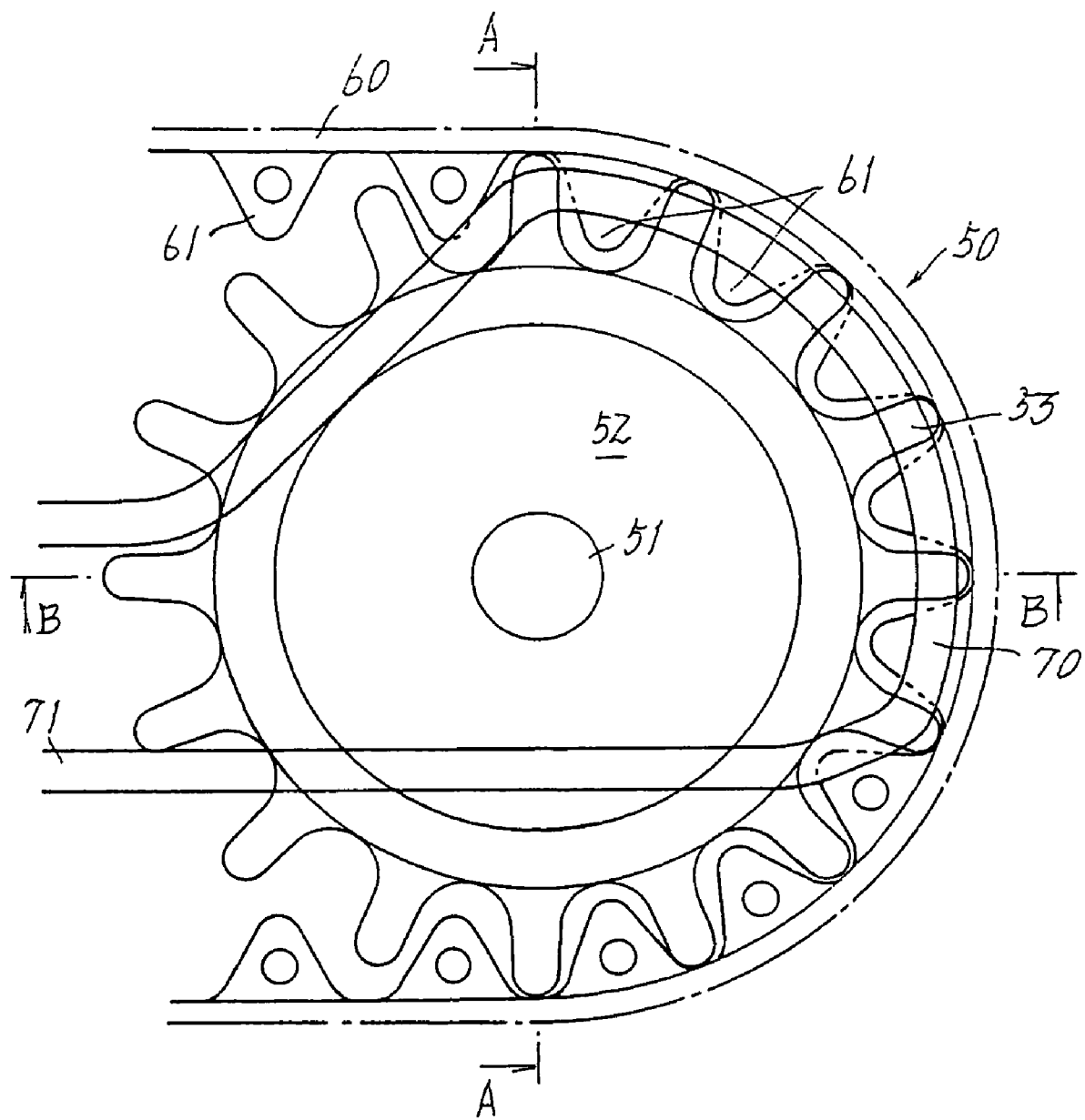
FIG. 4 is a side view of a main portion of a rubber crawler running device according to the present invention.
Figure 4A:
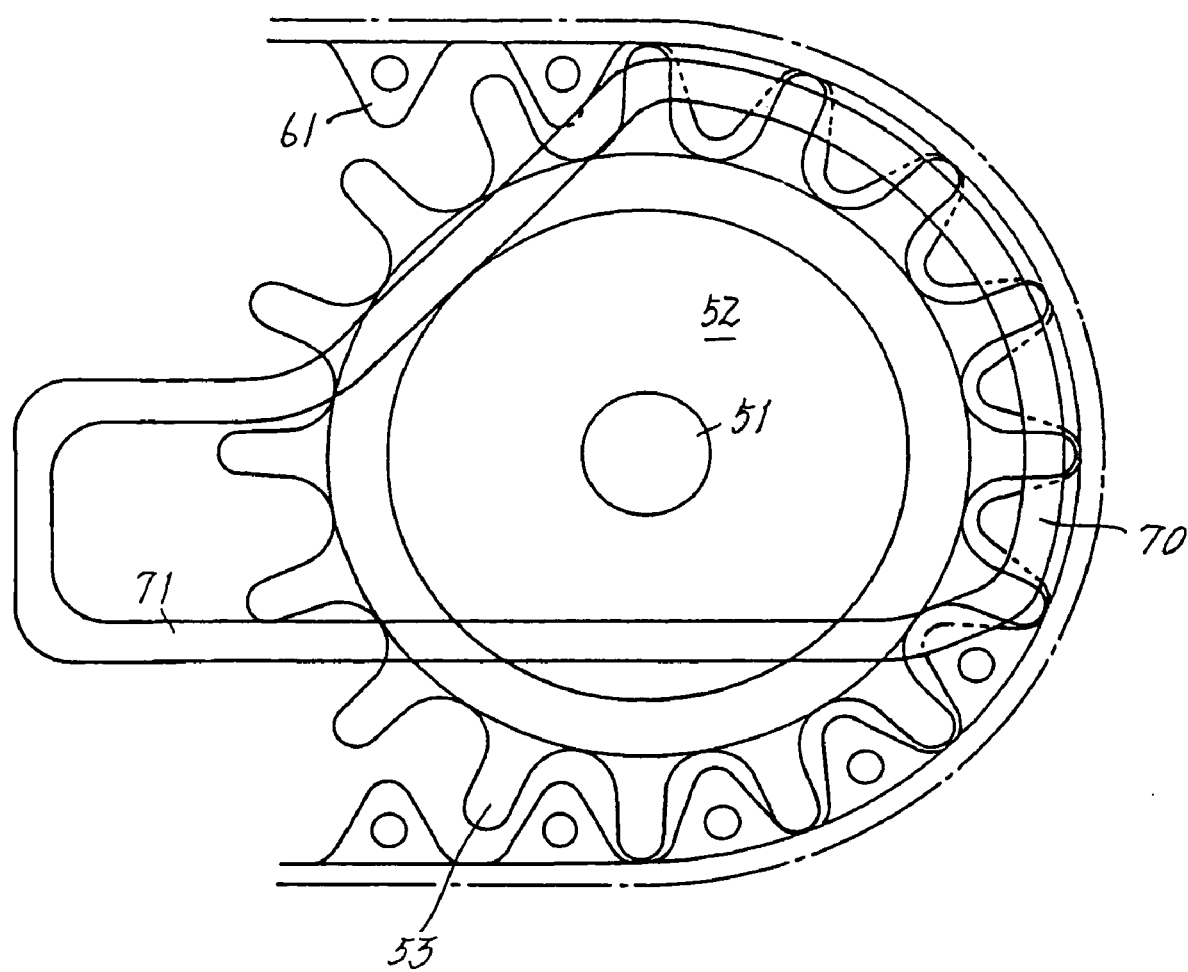
FIG. 4A is a side view of a main annular portion of a rubber crawler running device according to the present invention.
Figure 5:
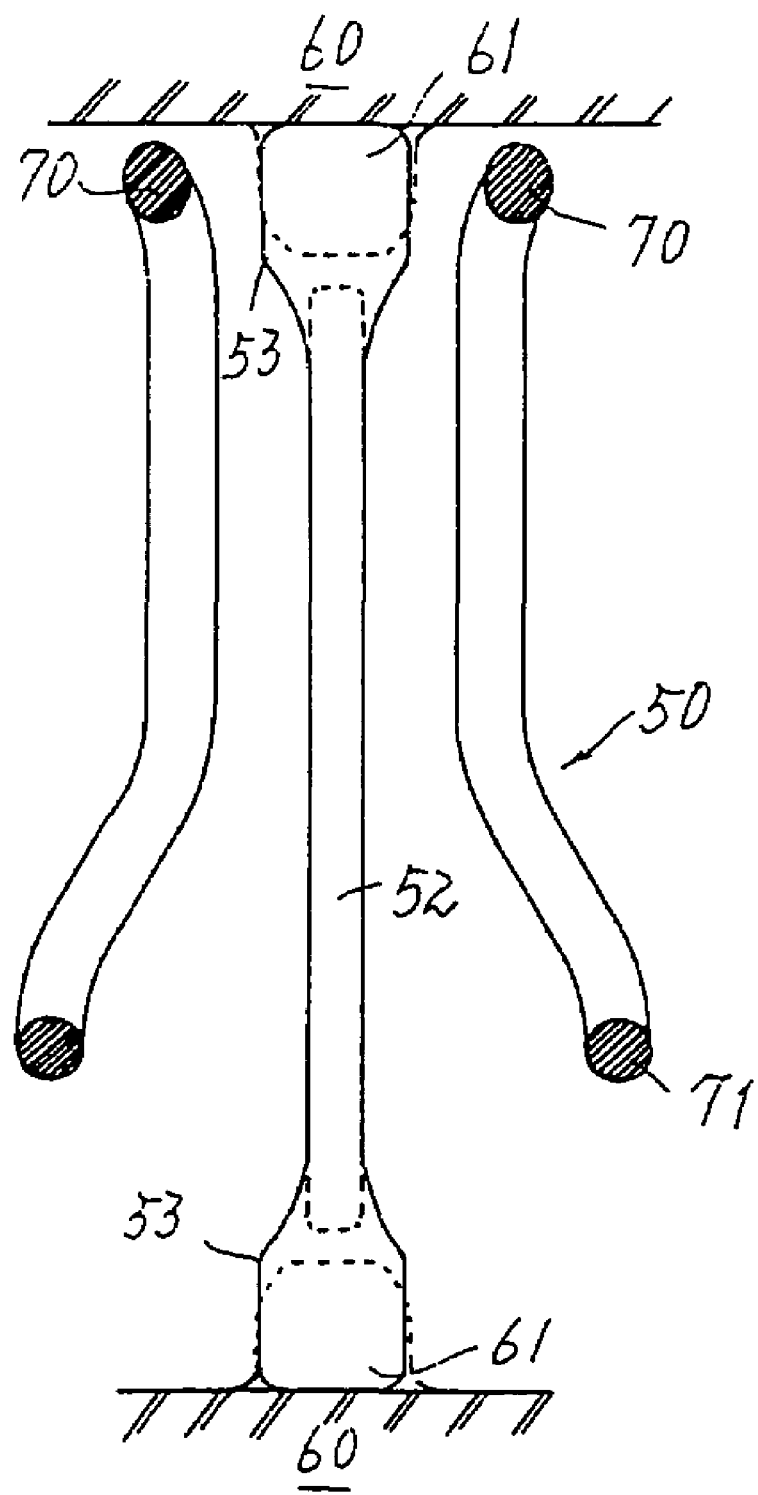
FIG. 5 is a cross-sectional view taken along line A-A of FIG. 4.
Figure 6:
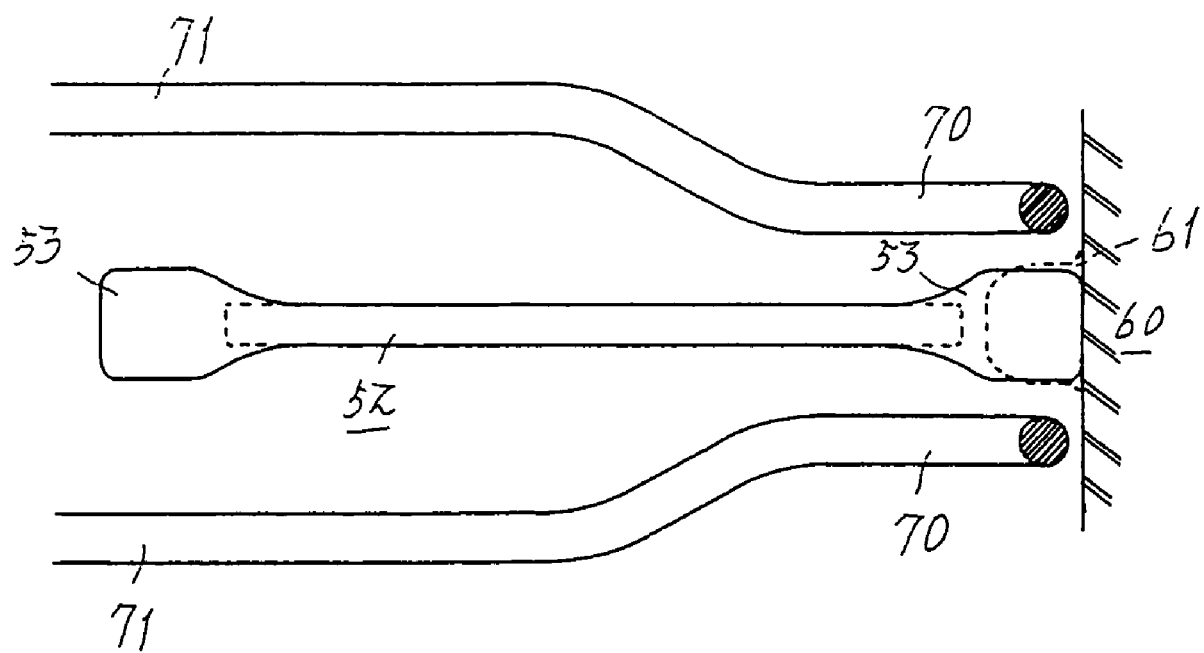
FIG. 6 is a cross-sectional view taken along line B-B of FIG. 4.

The present invention will be described in further detail with reference to the drawings. FIG. 4 is a side view of a main portion of a structure 50 for driving the rubber crawler according to the present invention, FIG. 5 is a cross-sectional view taken along line A-A, and FIG. 6 is a cross-sectional view taken along line B-B. In the drawings, the drive wheel 52 which is the same as that shown in FIG. 2 is mounted to a drive shaft 51 which extends from a vehicle body (not shown). Engaging teeth 53 are provided on the periphery of the drive wheel 52. Reference numeral 60 indicates a coreless type rubber crawler, and reference numeral 61 indicates rubber projections formed on the inner periphery of the rubber crawler 60 at predetermined intervals. The engaging teeth 53 engage with the rubber projections 61.

Reference numeral 70 indicates a guide skirt bodies formed by a circuitous body. Annular bodies 70 are provided along right and left side portions of the engaging teeth 53. In this example, the guide skirt body is disposed at a portion which at least does not contact the road surface and at which the rubber projections 61 engage with the engaging teeth 53. The guide skirt body includes a circuitous bodies 70 extending to the right and left sides of the rubber projections 61 with predetermined gaps therebetween. The gaps between the right and left sides of the rubber projections 61 and the guide skirt body are set such that the total width of the gaps between the rubber projections 61 and the circuitous bodies 70 is equal to or less than the width of the rubber projection 61 in the transverse direction thereof. When the width W of the rubber projection 61 in the transverse direction is, for example, 80 mm, a gap W0 between the rubber projections 61 and the portion of the circuitous body 70 which is disposed at the right and left sides of the engaging teeth 53 is 40 mm or less, and preferably about 20 mm. Specifically, the circuitous bodies 70 are curved closer to the drive wheel 52 than its base portion 71 is, which extends from the vehicle body. Each circuitous body 70 may conveniently have a substantially circular cross section.

The rubber crawler running device of the present invention is structured as described above. First, since the rubber crawler running device has no closed space for the mud and the like which have been tangled around or have adhered to the engaging teeth 53, the mud can be discharged from the right and left sides of the engaging teeth 53. Secondly, since the rubber crawler running device includes the guide skirt bodies 70, when the rubber crawler 60 is about to be disengaged from the engaging teeth 53 in the lateral directions, the rubber projections 61 provided on the rubber crawler 60 contact the guide skirt bodies 70 so that the rubber crawler 60 cannot move any further in the lateral directions. In this way, running off of the rubber crawler 60 from the drive wheel 52 can be prevented.

In this example, each guide skirt body (circuitous body) 70 is disposed so as not to pinch the right and left portions of the rubber projections 61 at a portion of the rubber crawler 60 contacting the ground. With this structure, the discharge of soil to the right and left sides of the rubber crawler 60 is not interrupted.

Figure 7:
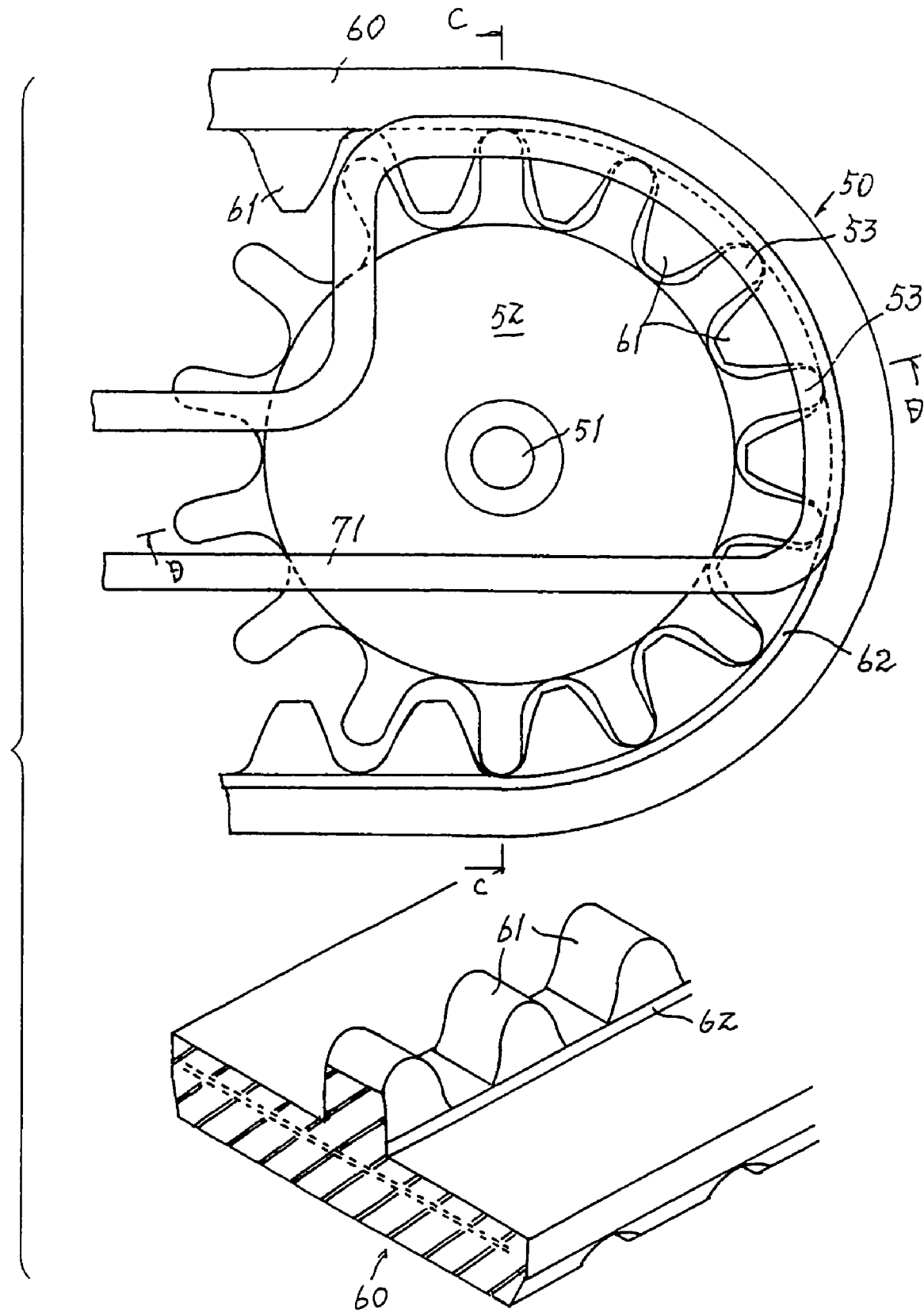
FIG. 7 is a side view of a main portion of a structure for driving a rubber crawler in accordance with a second example of the present invention.
Figure 8:
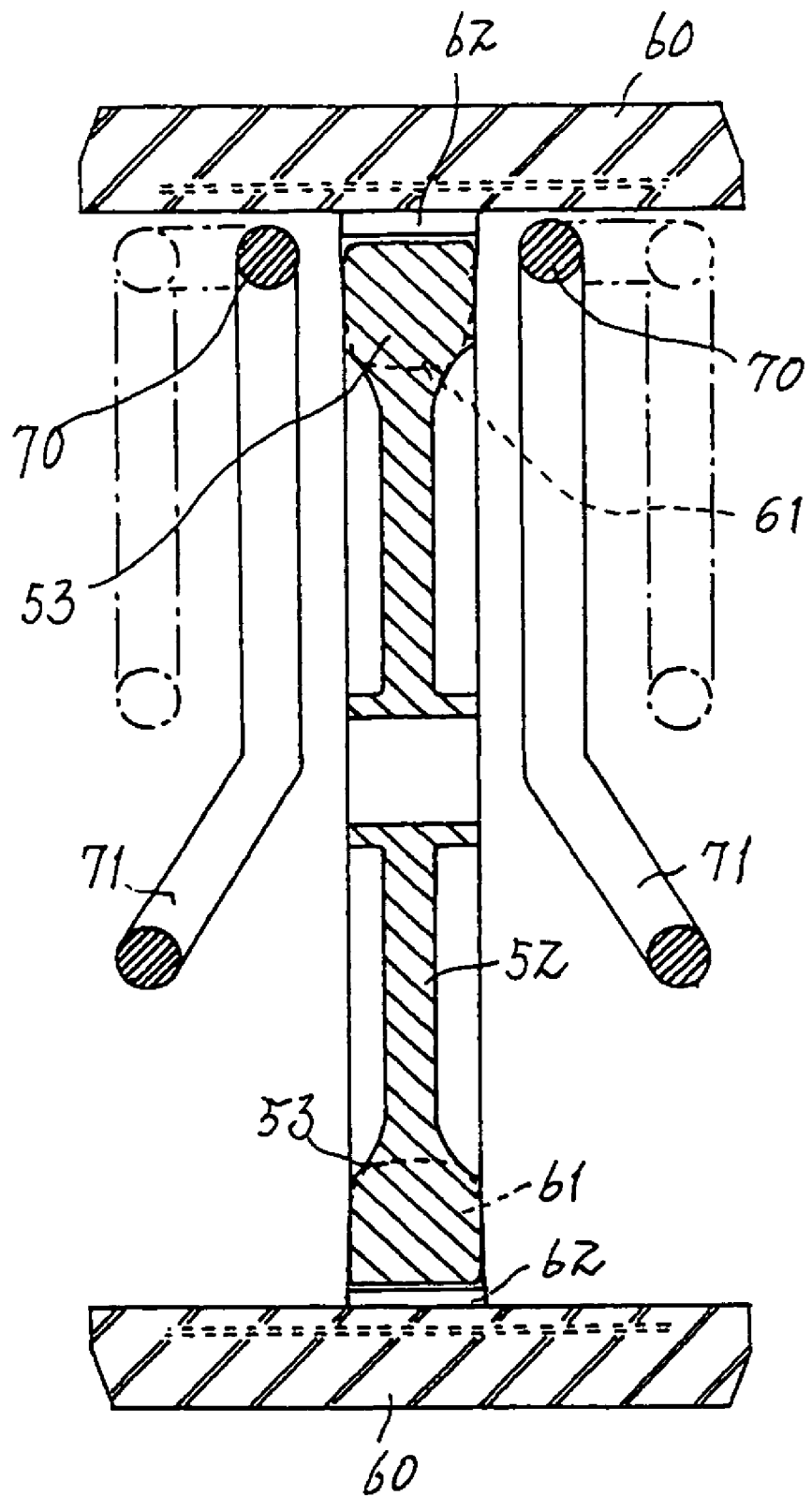
FIG. 8 is a cross-sectional view taken along line C-C of FIG. 7.
Figure 9:
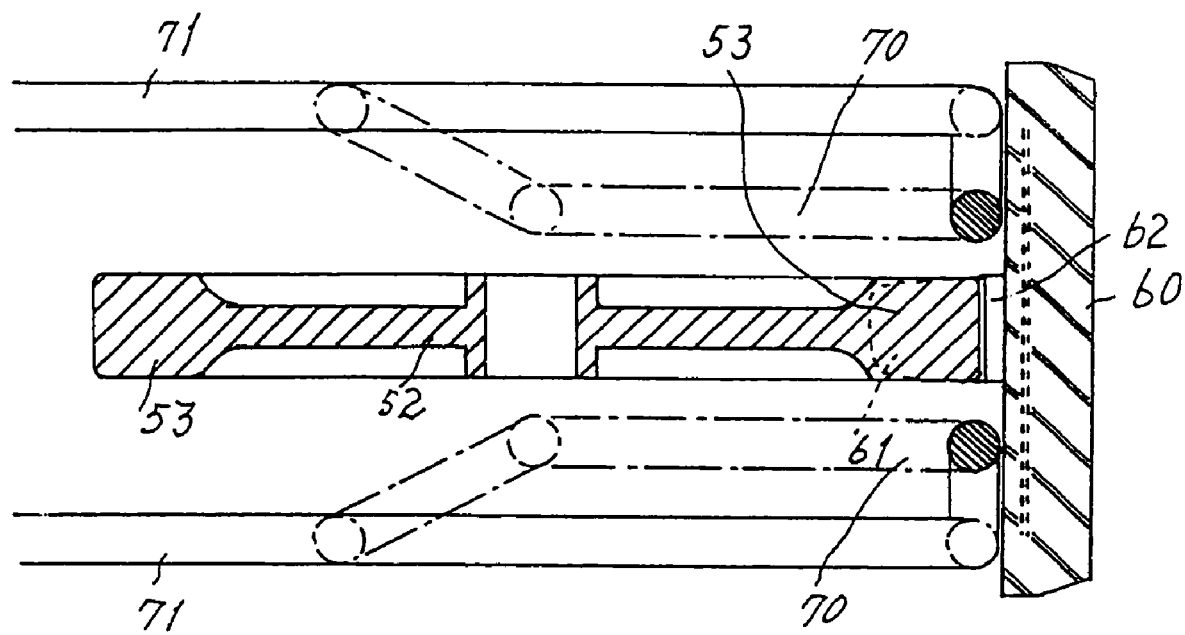
FIG. 9 is a cross-sectional view taken along line D-D of FIG. 7.

FIG. 7 is a side view of a main portion of the structure 50 for driving a rubber crawler in accordance with a second example of the present invention. FIG. 8 is a cross-sectional view taken along line C-C, and FIG. 9 is a cross-sectional view taken along line D-D. This example is different from the previous example in that the rubber projections 61 are formed on a protruding streak 62, which is formed on the inner peripheral surface of the rubber crawler 60 so as to have a substantially trapezoidal cross section. Because of the presence of the protruding streak 62, this example has a significant advantage in that mud and the like which have moved into the rubber crawler 60 and adhered to the inner peripheral surface thereof hardly move onto the protruding streak 62 and adhere to the vicinity of the rubber projections 61 or to the drive wheel 52.

Further, the guide skirt bodies 70 may be disposed at a position where the guide skirt bodies 70 contact the rubber projections 61. However, when the guide skirt bodies 70 are disposed as close to the protruding streak 62 as possible so that the guide skirt bodies 70 contact a side of the protruding streak 62, the contact is not intermittent, and direction control becomes relatively easy. This structure also has advantages in that the load applied to the rubber projections 61 is reduced and the rubber projections 61 are hardly chipped away.

INDUSTRIAL APPLICABILITY

As described above, the present invention provides an improved running device for a rubber crawler. This device reduces the formation of a layer of foreign materials, such as mud, adhering to the inner peripheral surface of the rubber crawler or the drive wheel and, as a result, running-off of the rubber crawler from the drive wheel is significantly reduced. The rubber crawler running device, which is extremely excellent from a practical standpoint because it requires little time-consuming effort for maintenance and can increase the life of the rubber crawler, can be used.

The invention claimed is:

1. A rubber crawler running device which includes a drive wheel connected to a drive shaft of a vehicle body, an idler wheel, and a rubber crawler having rubber projections formed on an inner peripheral surface thereof at predetermined intervals, lower end portions of the drive wheel and the idler wheel being disposed near a running surface, the rubber crawler being wound around the drive wheel and the idler wheel and contacting the running surface, wherein the drive wheel is formed so that engaging teeth thereof which engage with the rubber projections are exposed at right and left sides, and further comprising a circuitous guide skirt body having an upper portion and a lower portion, the guide skirt body being disposed at an outer side of the drive wheel and the rubber projections, where the rubber projections engage with the engaging teeth of the drive wheel with a predefined clearance with respect to the drive wheel in a widthwise direction of the drive wheel, and the guide skirt body upper portion provided closer to an upper part of the drive wheel and the rubber projections than the lower portion thereof, wherein the upper portion of the guide skirt body parallels the circular shape of the drive wheel, for about 90 degrees of the drive wheel, from an upper to a lateral portion of the drive wheel with respect to the drive wheel's engagement with the rubber projections, such that the rubber crawler is substantially prevented from moving in a lateral direction, and wherein the lower portion of the guide skirt body flares outward from the drive wheel and the upper portion of the guide skirt body.

2. The rubber crawler running device of claim 1, wherein the drive wheel includes a central portion, and engaging teeth, which engaging teeth are formed radially from the central portion and engage with surfaces of the rubber projections in a longitudinal direction of the rubber crawler.

3. The rubber crawler running device of claim 1, wherein the rubber projections are formed on a protruding streak continuously formed on the inner peripheral surface of the rubber crawler.

4. The rubber crawler running device of claim 1, wherein the total width of a gap between the rubber projections and the guide skirt bodies at the right and left sides is equal to or less than the width of the rubber projection in a transverse direction thereof.

* * * * *